US006848058B1

(12) United States Patent
Sinclair et al.

(10) Patent No.: US 6,848,058 B1
(45) Date of Patent: Jan. 25, 2005

(54) POWER REDUCTION CIRCUIT AND METHOD WITH MULTI CLOCK BRANCH CONTROL

(75) Inventors: David E. Sinclair, Markham (CA); Eric Young, Scarborough (CA); Sami J. Haouili, Toronto (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/325,882

(22) Filed: Jun. 4, 1999

(51) Int. Cl.[7] .................................................. G06F 1/26
(52) U.S. Cl. ........................................ 713/322; 713/501
(58) Field of Search ............................... 713/322, 501; 307/31, 39

(56) References Cited

U.S. PATENT DOCUMENTS

| | | | | |
|---|---|---|---|---|
| 5,544,101 A | * | 8/1996 | Houston ...................... 327/407 |
| 5,675,808 A | * | 10/1997 | Gulick et al. ................ 395/750 |
| 5,781,768 A | * | 7/1998 | Jones, Jr. ..................... 713/501 |
| 6,256,743 B1 | * | 7/2001 | Lin ............................... 713/310 |
| 6,263,448 B1 | * | 7/2001 | Tsern et al. .................. 713/501 |
| 6,307,281 B1 | * | 10/2001 | Houston ....................... 307/31 |

* cited by examiner

Primary Examiner—Jeffrey Gaffin
Assistant Examiner—Harold Kim
(74) Attorney, Agent, or Firm—Vedder, Price, Kaufman & Kammholz, P.C.

(57) ABSTRACT

A power consumption reduction circuit and method utilizes a memory clock source and a memory clock divider circuit that generates divided memory clock output signals as a plurality of corresponding independent clock signals to a number of different processing engines. A memory clock divider circuit and method selectively activates a plurality of independent clock signals in response to received condition data. In one embodiment, an engine clock source is also coupled through a switching circuit such that it is selectively output to one or more processing engines. The switching circuit disables the output from the engine clock based on register condition data. In another embodiment, a plurality of memory read latch circuits are controlled by a memory read latch control circuit. The memory read latch control circuit is operative to dynamically activate and deactivate the plurality of memory read latches based on detected memory read requests to facilitate memory access activity-based power reduction.

27 Claims, 3 Drawing Sheets

POWER REDUCTION CIRCUIT AND METHOD WITH MULTI CLOCK BRANCH CONTROL

FIELD OF THE INVENTION

The invention relates generally to circuits and methods for reducing power consumption for electronic circuits, and more particularly to circuits and methods that reduce power consumption for devices employing a memory control.

BACKGROUND OF THE INVENTION

Portable electronic devices such as notebook computers, personal organizers, portable telecommunication equipment and other electronic devices consume much power during their display mode. By way of example, graphics control chips for laptop computers may be integrated circuits having synchronous dynamic ram (SDRAM) on the same die as the memory controller, other video and graphics processors, and central processing units if desired. For example, a conventional type of graphics control circuit may include a number of memory access request circuits (or access request engines) such as a video capture engine, a two dimensional and three dimensional drawing engine, a display engine, a video playback engine, a host processor, onboard SDRAM, SGRAM or other RAM serving as the frame buffer memory, a memory controller and a phase lock loop circuit (PLL) for generating a memory clock. As known in the art, each engine may have another clock, other than the memory clock, such as from another PLL or external clock, creating a clock boundary. Graphics control chips typically also include another phase lock loop circuit for generating a clock for a display device (or devices) such as a CRT that may plug into the laptop computer or an LCD display that is mounted to the laptop computer. A central processing unit (CPU) of the computer interfaces with the graphics chip and other peripheral devices as known in the art. A laptop computer or a portable device may include a TV tuner or video decoder, as part of a multimedia package, that sends video information to the video capture engine for eventual display on the LCD display after being stored in the memory.

With chips such as graphics controller chips, the many graphic engines 102 attempt to access the memory to perform their necessary operations. However only one of the graphic engines can typically access the memory at a given time. In addition, multiple memory controllers may be configured to access different portions of memory at the same time. Some of the display operations require real-time processing, such as video capture operation, display operation and video playback, so that real-time display can occur on the LCD display, or any suitable display device. For example, where the TV tuner is applying video to the video capture engine, the video should be processed in real-time to facilitate display in real-time which is necessary, for example, for live performances or when the TV tuner is providing live feed. Hence this engine has a higher priority over, for example, a 2D or 3D drawing engine which may be slightly delayed and still provide the user with high performance on display times.

A problem arises with such devices since power consumption and thermal dissipation needs to be minimized for portable devices without unnecessarily sacrificing operational performance. Also, the same problem arises for non-portable devices due to increased circuit density and increased clock speeds. The power dissipation of a graphics controller chip and other integrated circuits are typically related to the operational activity of memory. Conventional portable display systems typically have power management systems that generate system level standby/suspend commands. During system level standby/suspend modes, graphics controller subsystems and other subsystems may typically respond by forcing the frame buffer memory into a low power self refresh mode for the duration of the system level standby/suspend mode. This may be done for example by pulling a memory clock enable line low and other suitable pins to put the memory in a self refresh mode. The synchronous memories are designed to switch into energy savings modes based on the level of the memory clock enable signal. In addition, the memory clocks, engine clocks, register clocks and other clocks are also disabled during suspend mode to save energy.

FIG. 1 shows, by way of example, a block diagram of a portable display system used in devices such as a laptop computer, a handheld processing device, telecommunication device or any other suitable portable display device, that generates graphics and/or video display information to a display device and employs system level standby/suspend power management control. When the display system is a laptop computer, such systems typically include an operating system 10 that operates under control of a central processing unit, for example, and a power management control system 12 which then generates a suspend/standby command 14 to a memory controller 16. The memory controller 16 then generates a clock enable/disable signal 18 to, for example, control a memory clock enable pin (and/or other pins) on a graphics memory device 20 to put the synchronous memory in a self refresh mode during the system level standby/suspend mode (e.g., the inactive mode). The graphics memory device 20 may be, for example, an SDRAM, SGRAM or any other suitable graphics and/or video memory device. The operating system 10 generates a suspend/standby command 22 when, for example, the laptop computer is in a standby/suspend mode as activated through a graphic user interface, software controlled timer, switch or other trigger event. Accordingly, such systems can reduce the power of the graphic subsystem which includes the synchronous memories used for frame buffer operations. A clock enable signal 18 is typically the memory clock enable 10 on the memory device 20. This control typically only puts the SGRAM or memory device in a low power mode when the graphic system is completely idle and turns off the memory clock and other clocks during the suspend mode. When the operating system 10 indicates that the display is in the active mode (e.g., the display is enabled), the memories are typically always enabled and the memory clock is always running.

However, such systems do not typically provide suitable power reduction during the active operational mode of the system since the memory clock is always running regardless of which circuits may be idle during the active mode. For example, various memory request engines 24a–24n, although in the active mode, may not be generating memory requests to memory controller 16.

In addition, many circuits employing memory controllers such as graphics accelerator circuits and video processing circuits may also use memory read data latching flops which latch data read from memory. Such latching circuits may include, for example, a plurality of flops designed to latch read data from memory based on a memory access request. Also typically, the latches are controlled by a memory clock circuit and if desired, an additional clock circuit to compensate for delays including circuit board line delays so that read data is not inadvertently skewed to the wrong clock cycle when read out from memory. These flops are typically always active. For example, the clock to the groups of flops are constantly running. During non-read cycles, undesired data is fed through the read path of the chip consuming power and potentially adding additional switching noise.

Graphics processing circuits are also known to stop the engine clock and/or register clocks during suspend and standby modes. This typically prevents access to registers for the graphics processing circuits. Other graphics processing circuits are known which have activity-based power reduction by turning off, for example, a graphic user interface clock to a GUI generating engine and a three dimensional rendering engine clock to 3D engine when the 3D engine is not being used. This is typically done because the 3D engine, when operational, can consume large amounts of processing capability of the graphics processing circuitry. As such, branches from a common engine clock are selectively turned off based on an activity level. However, it is typically done for only the larger processing engines. In addition, where the engines utilize more than one clock, only one clock, such as an engine clock, is controlled. The memory clock in such engines is typically allowed to continue to operate during the active mode.

Consequently, there exists a need for a dynamic power reduction circuit that can reduce power consumption and power dissipation without unnecessarily degrading system performance during active system modes. It would be advantageous, if such a system could detect memory access demand and automatically adjust memory operation accordingly to facilitate power reduction.

BRIEF DESCRIPTION OF THE DRAWINGS

The invention described herein will be more readily understood in view of the following drawings where.

DETAILED DESCRIPTION OF A PREFERRED EMBODIMENT OF THE INVENTION

Briefly, a power consumption reduction circuit and method utilizes a memory clock source and a memory clock divider circuit that generates divided memory clock output signals as a plurality of corresponding independent clock signals to a number of memory interface circuits for different processing engines. The memory clock provides clock signals to circuits such as a memory controller and memory interface circuit for memory request engines. The memory interface circuits are used for servicing and managing memory requests. A memory clock divider circuit and method selectively activates a plurality of independent clock signals in response to received condition data. Condition data may be activity based or user defined. Examples of condition data may include, for example, whether a primary or secondary display has been selected, whether a graphic user interface engine is active, whether a video overlay scaler has been enabled, whether subpicture operation has been enabled, and whether video capture operations have been enabled. If desired, the speed of the memory clock may also be sped up or slowed down depending upon the type of memory requests seeking data from a memory (such as a frame buffer).

In one embodiment, an engine clock source is also coupled through a switching circuit such that it is selectively output to one or more processing engines, such as video overlay engines, video capture engines or any other suitable data processing engine, storage circuits or other suitable circuits. As such, the engine clock provides clock signals to memory requests engines and other general purposes processing engines for example, programmable read write registers. The switching circuit disables the output from the engine clock based on register condition data. register condition data may include, for example, whether a multimedia port has been enabled, whether a video capture processor has been enabled, whether standby mode has been enabled, whether a graphic user interface is active, or any other suitable condition.

In addition, the power consumption reduction circuit and method may also include a plurality of memory read latch circuits and a memory read latch control circuit. The memory read latch control circuit is operative to dynamically activate and deactivate the plurality of memory read latches based on detected memory read requests to facilitate memory access activity-based power reduction.

Figure 1:
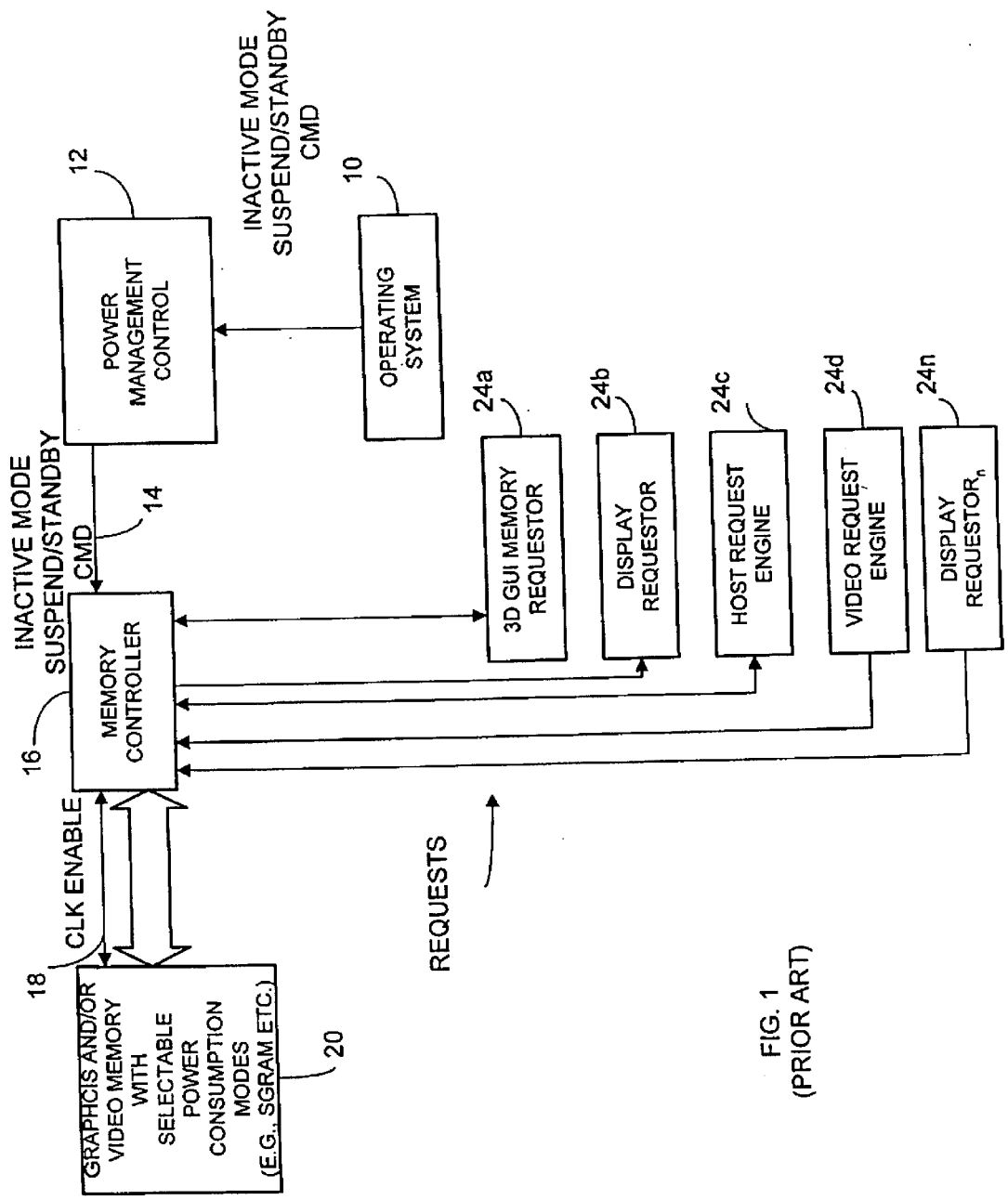
FIG. 1 is a block diagram generally illustrating a conventional graphics accelerator circuit.
Figure 2:
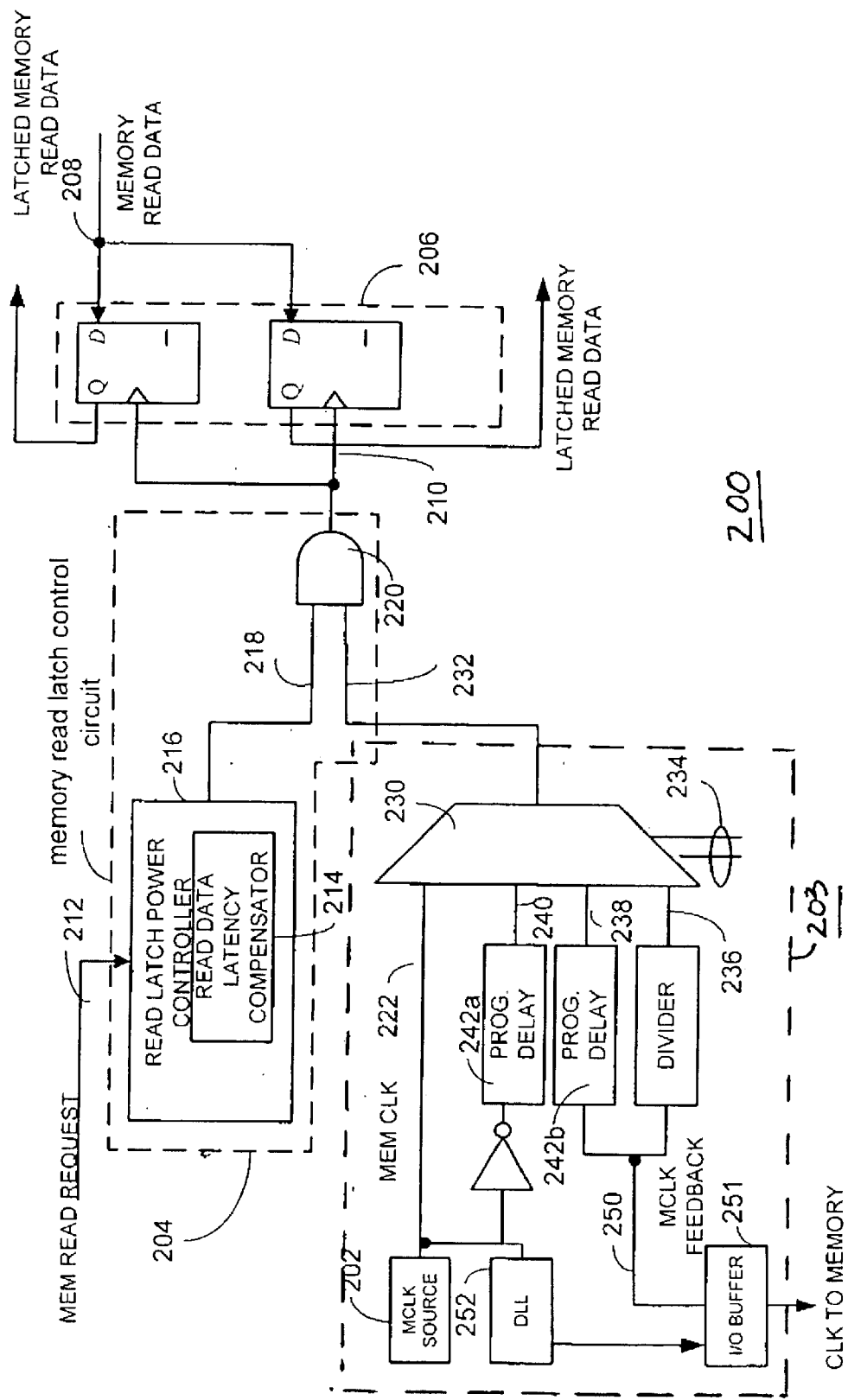
FIG. 2 is a block diagram illustrating one example of a power consumption reduction circuit in accordance with one embodiment of the invention.

FIG. 2 shows one example of a power consumption reduction circuit 200 having a memory clock source 202 and a memory clock divider circuit 203 operatively coupled to a plurality of memory read latch circuits 206. The plurality of memory read latch circuits 206 receives memory data 208 that is read from memory such as frame buffer memory (not shown). The memory read latch control circuit 204 dynamically activates and deactivates the plurality of memory read latches 208 through a control signal 210 based on detected memory read requests 212. The detected memory read requests 210 based on detected memory read requests 212. The detected memory read requests 212 may be any suitable memory access request from a suitable requestor, such as a graphic user interface engine, video overlay engine or any other suitable memory request engine.

The memory read latch control circuit 204 includes a read data latency compensation circuit 214 which determines how long it takes for memory to fetch data. This may be a preprogrammed register, for example. As known in the art, a memory read request 212 indicates typically how long to leave the read latches 206 on and also the read latency period. The memory read latch control circuit 204 includes control logic 216 that receives the memory read request 212 and obtains the read data latency information and generates a read latch control signal 218, which in this embodiment, indicates when to turn off the read latching flops during an active mode to reduce power consumption. The memory read latch control circuit 204 also includes an AND circuit 220 responsive to the read latch control signal 218 and also responsive to a memory clock signal 222 generated by the memory clock source 202. The AND circuit 220 may be a hardware circuit, software or any suitable combination thereof. Likewise, the memory read latch control circuit 204 may be implemented using hardware, suitably programmed microcontrollers or other programmed logic circuitry, hardware state machine or any other suitable logic. The AND circuit 220 selectively enables and disables the memory read latches by generating the enable signal 210 as a function of the memory request 212. For example, if a memory read request 212 is detected, the read latch control signal 218 is activated to allow the memory clock signal 222 to be passed through the AND gate 220 to provide the enable signal 210 to the plurality of read latching flops 206 for the time determined from the read data latency to allow the suitable data to be obtained from memory. It will be recognized that any suitable gating logic may also be used, such as a multiplexing circuit 230 where one input is tied to an idle value or any other suitable logic.

As shown, the circuit 200 may also include a multiplexer 230 having an output 232 which may be the memory clock signal 222 or any other signal input to the multiplexer as selected by clock select signal 234. As such, in this embodiment, the multiplexer 230 has an input coupled to receive the memory clock signal 222, an input coupled to receive a memory clock feedback signal 236, a memory clock feedback signal with programmable delay 238 and an inverted memory clock signal with a programmable delay 240. The programmable delays 242a and 242b may be used, for example, to insure that timing is suitable for activation of the read latching flops based on layout delays caused by the location and length of signal lines on a printed circuit board or integrated circuit.

In operation, the memory clock feedback signal 250 obtained from an 10 buffer circuit 251 that receives a delayed memory clock signal from DLL 252. DLL 252 attempts to mimic the delay of the memory clock to the memory. The multiplexer 230 is controlled to output a memory clock signal 232 or divided memory clock feedback signal 236 or delayed memory clock feedback signal 238 or inverted delayed memory clock signal 240. In addition, it will be recognized that a DLL may not be used in which case delays can be compensated by any other suitable mechanism.

The circuit dynamically turns on and off the read latching flops 206 based on the memory cycles. The plurality of flops are only enabled for read cycles and a few cycles of margin around the memory read cycles as dictated by the latency compensation duration. During other cycles, the read flops will not be active thereby reducing power consumption and noise. This noise reduction can be useful with wider memory bus widths. Moreover, since data such as undesired data from read latching flops is not causing toggling during non-read conditions, additional power savings may be achieved.

Figure 3:
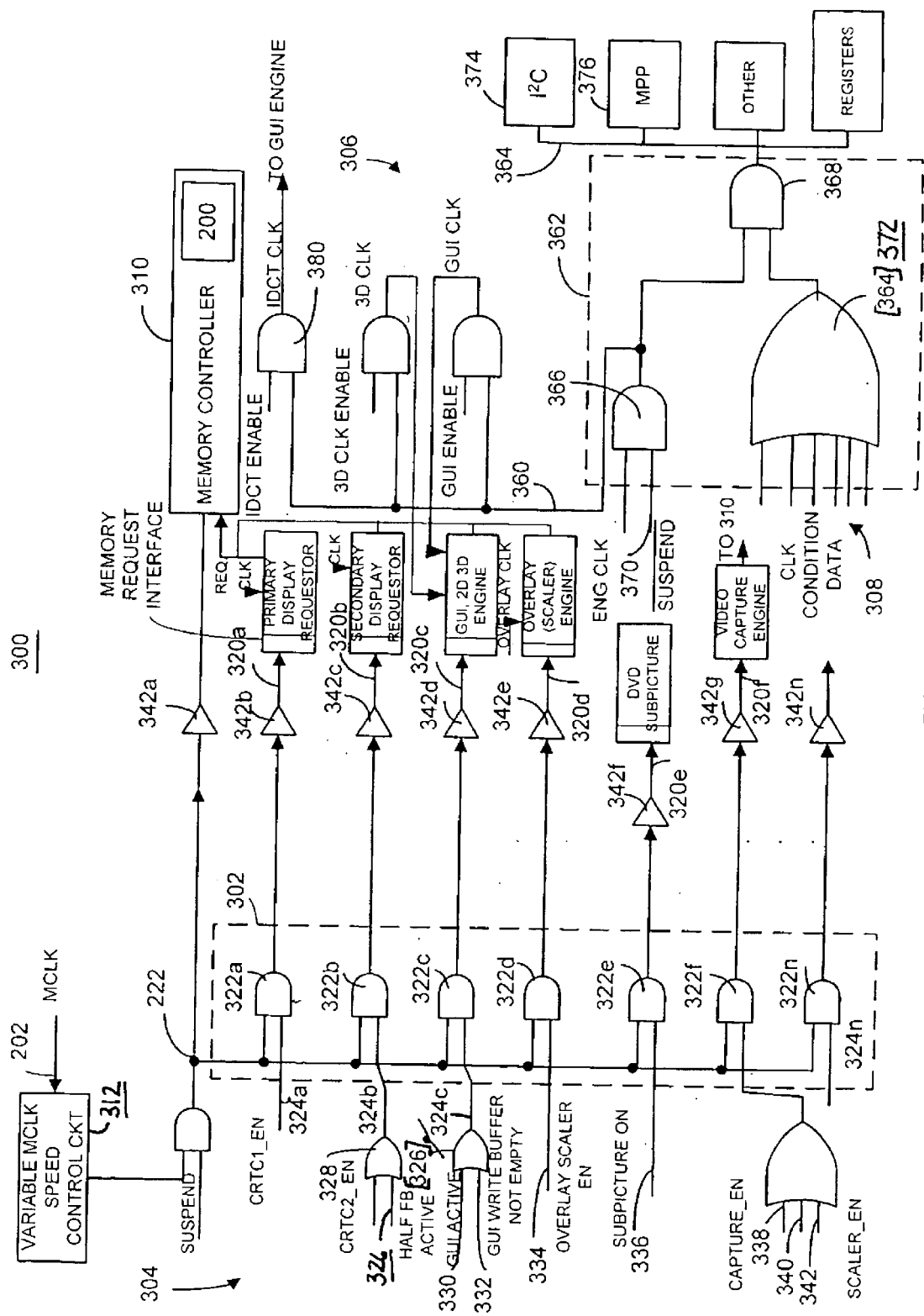
FIG. 3 is a block diagram illustrating an example of a power consumption reduction circuit in accordance with one embodiment of the invention.

FIG. 3 illustrates an example of a power consumption reduction circuit 300 employing a memory clock divider circuit 302 that is responsive to memory clock condition data 304, and an engine block circuit 306 responsive to engine clock condition data 308. Examples of engine clock condition data include, for example, data representing whether I2C is enabled or whether a multimedia port is enabled. These may be user defined. Other examples include data representing a host write buffer is not empty, whether video capture engine is enabled, whether an overlay scaler is enable, whether a CUI engine is active and any other suitable condition. As shown in this embodiment, a memory controller 310 may include, if desired, the power, consumption reduction circuit 200 to control the memory read latches as previously described. However, it will be recognized that the circuit 302 and 306 may be used each alone or in combination with one another and with the power consumption reduction circuit 200. Also shown in this embodiment is a variable memory clock speed control circuit 312, such as that described in co-pending patent application Ser. No. 09/130,746, filed on Aug. 7, 1998, entitled "Dynamic Memory Clock Control System and Method", by Lee et al., owned by instant Assignee and hereby incorporated by reference. However, it will be recognized that the variable memory clock circuit may be omitted or that any suitable variable memory clock speed control circuit may be used.

The memory clock divider circuit 302 receives the memory clock signal 222 from a suitable memory clock source. The memory clock divider circuit 302 generates divided memory clock output signals 320a–320n. The divided memory clock output signals 320a–320n are a plurality of independent clock signals in this embodiment, shown as multiple independent branches. A memory clock divider circuit 302 selectively activates at least some of the plurality of independent clock signals in response to received memory clock condition data 304. Examples of memory clock condition data may include activity-based, user defined condition data associated with differing data processing units or request data.

In this embodiment, the example of the memory clock divider circuit 302 includes a plurality of AND circuits 322a–322n wherein each AND circuit outputs one of the plurality of corresponding independent clock signals 320a–320n. Although not shown, it will be recognized that suitable anti-glitching circuitry can be used to remove glitches when stopping and restarting the clock. Each AND circuit is coupled to receive different condition data 304 associated with different condition data sources, such as CRT controllers, frame buffer controllers, GUI engines, video scalers, video capture engines and any other suitable condition data source.

By way of illustration, AND circuit 322a receives condition data CRT controller (CRTC) enable data, which may be, for example, a register bit indicating that a cathode ray tube has been enabled as the primary display device using the primary CRTC. The CRTC enable data is indicated as condition data 324a. Similarly, where a plurality of displays are connected for use, another AND circuit 322b may receive second CRTC enable data 324b indicating that a secondary display has been selected so that the graphics processor will output display data to two different display units using two different CRTC's (or any other suitable display controllers). Since display units may be of different types, additional condition data may be logically coupled as being required before the memory clock to that engine is disabled during normal operation. As shown in FIG. 3, a half frame buffer signal 326 may serve as an input through an OR circuit 328 whose output serves as condition data 324b. As such, it will be recognized that additional condition data may be logically configured to provide a suitable enabling or disabling of a memory clock to a selected processing engine as desired.

Such a combination of condition data is shown for AND circuit 322c. In this example, the graphic user interface engine receives the independent clock signal 320c only after GUI active condition data 330 and GUI write data 332 are active. The GUI write condition data 332 indicates that the GUI write buffer is not empty so that the system knows when the GUI engine is finished writing to memory. Other condition data for the memory clock divider circuit 302 includes scaler enable data 334, subpicture "on" data 336 indicating that the subpicture operation has been selected, video capture enable data 338, half frame buffer data 340 and scaler enable data 342. Condition data 338, 340 and 342 are used for a video capture engine so that the memory clock to the video capture engine will be disabled if none of the video capture related condition data is met.

If desired, individual buffer circuits 342a–342n may be operatively coupled between a requestor or engine and the memory clock divider circuit 302. The divided memory clock signal into independent clock signals or multiple independent branches, allows the fine tuning of memory clock inputs to provide power reduction on an activity-based basis or a user-elected basis during normal operation. As such, if user-defined data is used, a graphic user interface may be supplied to a user to select which engines are to be disabled (by way of disabling the memory clock input) during normal operation. As such, a selection of the available engines may be provided visually and the user may then directly or indirectly select the corresponding engines to be disabled. This data may then be stored so that only certain AND gates 322a–322n are enabled (through enable lines not shown). It will be recognized that the memory clock divider circuit 302 may be implemented via software or a combination of hardware and software if desired.

Engine clock circuit 306 includes an engine clock signal 360 coming from an engine clock source as known in the art. The engine clock signal is independently and selectively disabled for any suitable engine. As shown, a switching circuit 362 generates an output clock signal 364. Engine clock condition data is used to selectively couple the clock signal to at least one of a video overlay engine, a video capture engine, serial interface (e.g., I2C type) control logic and a multimedia port (MPP), or any other suitable processing engine such that the switching circuit 362 disables the output clock signal 364 based on condition data. by way of illustration, the switching circuit 362 may include an OR circuit 372 and AND circuit 366 and another AND circuit 368. The AND circuit 366 receives the engine clock signal 360 and a suspend/standby command signal 370. The engine clock signal 360 is then passed through the AND gate 366 when the suspend and standby mode is inactive, indicating normal operating mode. The OR gate 372 serves to allow any of the condition data to output the engine clock signal 360 through AND gate 368. In this example, OR gate 372 receives I2C enable data, multimedia port enable data, host write buffer data indicating whether the write buffer is empty, video capture enable data, overlay enable data, GUI engine active enable data, register access data (indicating that registers are being programmed), or any other suitable condition data. as such, an I2C engine 374 or a multimedia port 376 may have the engine clock signal selectively enabled or disabled based on requisite condition data. this facilitates a fine tuning capability from a power consumption perspective to allow both the engine clock and memory clock to be selectively disabled based on user selected conditions or activity based conditions. For example, where the system is employed in a graphic accelerator chip, the memory clock to the video overlay engine may be disabled by accelerator chip, the memory clock to the video overlay engine may be disabled by providing a scaler enable signal as user selected such that the memory clock signal 320d is not sent to the overlay scaler. In addition, an overlay enable signal may also be used as condition data to the engine clock control circuit 306 to prevent the associated registers for the overlay engine to be disabled by effectively disabling the engine clock to the overlay engine registers. In this way, a host processor and/or graphics processing engines cannot access the requisite registers associated with the video capture or video overlay engine.

In addition, an inverse discrete cosine transform (IDCT) AND gate 380 is provided to allow selective engine clock control for IDCT-related registers. This helps facilitate power reduction when video decode processing operations are not being performed.

It should be understood that the implementation of other variations and modifications of the invention in its various aspects will be apparent to those of ordinary skill in the art, and that the invention is not limited by the specific embodiments described. For example, although AND gates and OR gates are shown, any suitable gating circuits or logic may be used. It is therefore contemplated to cover by the present invention, any and all modifications, variations, or equivalents that fall within the spirit and scope of the basic underlying principles disclosed and claimed herein.

What is claimed is:

1. A power consumption reduction circuit comprising:
   a memory clock source of a graphics controller; and
   a memory clock tree circuit of a graphics controller, operatively coupled to the memory clock source, that generates branches of memory clock output signals as a plurality of corresponding independent clock signals to a number of memory interface circuits for differing processing engines and selectively activates at least some of the plurality of independent clock signals in response to received condition data during an active mode.

2. The circuit of claim 1 further including an additional engine clock source operatively coupled to a switching circuit that generates an output clock signal that is selectively coupled as a clock signal to at least one of: a video overlay engine, a video capture engine, I2C control logic and a multimedia port such that the switching circuit disables the output clock signal based on at least one of the following condition data: standby mode data, video overlay enable data, video capture enable data, I2C enable data, and multimedia port enable data.

3. The circuit of claim 1 further including a variable memory clock control circuit operative to vary a speed of the memory clock based on a type of memory request from a plurality of memory requesters.

4. The circuit of claim 1 including a plurality of memory read latch circuits and a memory read latch control circuit operative to dynamically activate and de-activate the plurality of memory read latches based on detected memory read requests to facilitate memory access activity based power reduction.

5. The circuit of claim 4 wherein the memory read latch control circuit generates a read latch enable signal and includes:
   a read data latency compensation circuit; and
   a gating circuit responsive to the read latch control signal and a memory clock signal operative to selectively enable and disable memory read latches as a function of memory requests.

6. The circuit of claim 5 including a multiplexer having an output operatively coupled to the gating circuit, a first input coupled to receive the memory clock signal, and a second input coupled to receive a memory clock feedback signal wherein the multiplexer is controlled to output at least one of the memory clock signal or the memory clock feedback signal to emulate clock delay in the circuit layout.

7. The circuit of claim 1 wherein the memory clock tree circuit includes a plurality of logic circuits, wherein each logic circuit outputs one of the plurality of corresponding independent clock signals and wherein each logic circuit is coupled to operatively receive different condition data associated with different condition data sources.

8. The circuit of claim 1, wherein the received condition data includes data representing at least one of: whether a primary or secondary display has been selected, whether a graphic user interface engine is active, whether a video overlay scaler has been enabled, whether subpicture operation has been enabled, and whether video capture operations have been enabled.

9. A power consumption reduction circuit comprising:
   a memory clock source of a graphics controller;
   a memory clock tree circuit of a graphics controller, operatively coupled to the memory clock source, that generates branches of memory clock output signals as a plurality of corresponding independent clock signals to a number of memory interface circuits for differing processing engines and selectively activates at least some of the plurality of independent clock signals in response to received condition data;

an additional engine clock source operatively coupled to a switching circuit that generates an output engine clock signal that is selectively coupled as a clock signal to each of a plurality of registers associated with at least one of: a video overlay engine, a video capture engine, I2C control logic and a multimedia port, such that the switching circuit disables the output engine clock signal in response to receiving condition data; and a plurality of memory read latch circuits and a memory read latch control circuit operative to dynamically activate and de-activate the plurality of memory read latches based on detected memory read requests to facilitate memory access activity based power reduction.

10. The circuit of claim 9 further including a variable memory clock control circuit operative to vary a speed of the memory clock based on a type of memory request from a plurality of memory requesters.

11. The circuit of claim 9 wherein the memory read latch control circuit generates a read latch enable signal and includes:

a read data latency compensation circuit; and a gating circuit responsive to the read latch control signal and a memory clock signal operative to selectively enable and disable memory read latches as a function of memory requests.

12. The circuit of claim 11 including a multiplexer having an output operatively coupled to the gating circuit, a first input coupled to receive the memory clock signal, and a second input coupled to receive a memory clock feedback signal wherein the multiplexer is controlled to output at least one of the memory clock signal or the memory clock feedback signal to emulate clock delay in the circuit layout.

13. The circuit of claim 9 wherein the memory clock tree circuit includes a plurality of logic circuits, wherein each logic circuit outputs one of the plurality of corresponding independent clock signals and wherein each logic circuit is coupled to operatively receive different condition data associated with different condition data sources.

14. The circuit of claim 9 wherein the received condition data includes data representing at least one of: whether a primary or secondary display has been selected, whether a graphic user interface engine is active, whether a video overlay scaler has been enabled, whether subpicture operation has been enabled, and whether video capture operations have been enabled.

15. A power consumption reduction method comprising:

generating branches of memory clock output signals as a plurality of corresponding independent clock signals to a number of memory interface circuits for differing processing engines;

selectively activating at least some of the plurality of independent clock signals in response to received condition data;

selectively coupling an engine clock signal that is a different clock signal from the plurality of corresponding clock signals to each of a plurality of registers associated with at least one of: a video overlay engine, a video capture engine, I2C control logic and a multimedia port to selectively disable the output engine clock signal in response to receiving condition data; and dynamically activating and de-activating a plurality of memory read latches based on detected memory read requests to facilitate memory access activity based power reduction.

16. The method of claim 15 further including varying a speed of the memory clock based on a type of memory request from a plurality of memory requestors.

17. The method of claim 15 including:

generating a read latch control signal based on a read data latency compensation duration; and selectively enabling and disabling memory read latches based on the read latch control signal and as a function of memory requests.

18. The method of claim 15 including:

outputting one of the plurality of corresponding independent clock signals from a different divider circuit based on receiving different condition data associated with different condition data sources.

19. The method of claim 15, wherein the received condition data includes data representing at least one of: whether a primary or secondary display has been selected, whether a graphic user interface engine is active, whether a video overlay scaler has been enabled, whether subpicture operation has been enabled, and whether video capture operations have been enabled.

20. A power consumption reduction circuit comprising:

a memory clock source of a graphics controller; and a memory clock tree circuit of a graphics controller, operatively coupled to the memory clock source, that generates branches of memory clock output signals as a plurality of corresponding independent clock signals to a number of memory interface circuits for differing processing engines without re-ordering instructions generated by a source code compiler if a source code compiler is in the graphics controller, and selectively activates at least some of the plurality of independent clock signals in response to received condition data during an active mode.

21. The circuit of claim 20 further including an additional engine clock source operatively coupled to a switching circuit that generates an output clock signal that is selectively coupled as a clock signal to at least one of: a video overlay engine, a video capture engine, I2C control logic and a multimedia port such that the switching circuit disables the output clock signal based on at least one of the following condition data: standby mode data, video overlay enable data, video capture enable data, I2C enable data, and multimedia port enable data.

22. The circuit of claim 20 further including a variable memory clock control circuit operative to vary a speed of the memory clock based on a type of memory request from a plurality of memory requestors.

23. The circuit of claim 20 including a plurality of memory read latch circuits and a memory read latch control circuit operative to dynamically activate and de-activate the plurality of memory read latches based on detected memory read requests to facilitate memory access activity based power reduction.

24. The circuit of claim 20 wherein the memory read latch control circuit generates a read latch enable signal and includes:

a read data latency compensation circuit; and a gating circuit responsive to the read latch control signal and a memory clock signal operative to selectively enable and disable memory read latches as a function of memory requests.

25. The circuit of claim 20 including a multiplexer having an output operatively coupled to the gating circuit, a first input coupled to receive the memory clock signal, and a second input coupled to receive a memory clock feedback signal wherein the multiplexer is controlled to output at least one of the memory clock signal or the memory clock feedback signal to emulate clock delay in the circuit layout.

26. The circuit of claim 20 wherein the memory clock tree circuit includes a plurality of logic circuits, wherein each logic circuit outputs one of the plurality of corresponding independent clock signals and wherein each logic circuit is coupled to operatively receive different condition data associated with different condition data sources.

27. A power consumption reduction circuit comprising:

a memory clock source of a graphics controller;

a memory clock tree circuit of a graphics controller, operatively coupled to the memory clock source, that generates branches of memory clock output signals as a plurality of corresponding independent clock signals to a number of memory interface circuits for differing processing engines and selectively activates at least some of the plurality of independent clock signals in response to received condition data during an active mode;

a variable memory clock control circuit operative to vary a speed of the memory clock based on a type of memory request from a plurality of memory requesters; and a plurality of memory read latch circuits and a memory read latch control circuit operative to dynamically activate and de-activate the plurality of memory read latches based on detected memory read requests to facilitate memory access activity based power reduction.

* * * * *